United States Patent
Agarwal et al.

(10) Patent No.: US 9,920,743 B2
(45) Date of Patent: Mar. 20, 2018

(54) WIND TURBINE DECELERATION METHOD AND SYSTEM

(71) Applicants: Pranav Agarwal, Guilderland, NY (US); Govardhan Ganireddy, Bangalore (IN); Mark Edward Cardinal, Altamont, NY (US); Venkata Krishna Vadlamudi, Bangalore (IN)

(72) Inventors: Pranav Agarwal, Guilderland, NY (US); Govardhan Ganireddy, Bangalore (IN); Mark Edward Cardinal, Altamont, NY (US); Venkata Krishna Vadlamudi, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 218 days.

(21) Appl. No.: 14/918,939

(22) Filed: Oct. 21, 2015

(65) Prior Publication Data
US 2017/0114775 A1 Apr. 27, 2017

(51) Int. Cl.
*F03D 9/00* (2016.01)
*H02P 9/04* (2006.01)
(Continued)

(52) U.S. Cl.
CPC ......... *F03D 7/0248* (2013.01); *F03D 1/0675* (2013.01); *F03D 9/003* (2013.01)

(58) Field of Classification Search
USPC .......................................... 290/44, 55; 416/1
See application file for complete search history.

(56) References Cited

U.S. PATENT DOCUMENTS

| 7,425,771 B2 | 9/2008 | Rivas et al. |
| 7,944,067 B2 | 5/2011 | Kammer et al. |
| (Continued) | | |

FOREIGN PATENT DOCUMENTS

| CN | 102889173 A | 1/2013 |
| WO | 2014071947 A1 | 5/2014 |

OTHER PUBLICATIONS

Craig L.M. et al., "Field testing of a passive electrodynamic brake for wind turbines", Electrical Machines and Drives, 1997 Eighth Interational Conference on (Conf. Publ. No. 444), pp. 229-233, Sep. 1-3, 1997, Cambridge.

(Continued)

*Primary Examiner* — Pedro J Cuevas
(74) *Attorney, Agent, or Firm* — Nitin N. Joshi

(57) ABSTRACT

A wind turbine includes wind turbine blades, a wind turbine rotor coupled to the wind turbine blades, a wind turbine generator coupled to the wind turbine rotor, a wind turbine converter coupled to the wind turbine generator, a controllable brake comprising one or more sources of controllable rotor torque adjustment for providing a first level of torque adjustment, a discrete brake for more coarsely providing a second level of torque adjustment, and a controller programmed for responding to a deceleration event by determining a required torque adjustment for braking, determining a sequence of applying the controllable brake and the discrete brake for driving a combination of the first and second levels of torque adjustment towards the required torque adjustment, and providing control signals for decelerating the wind turbine.

15 Claims, 4 Drawing Sheets

(51) Int. Cl.
  *F03D 7/02* (2006.01)
  *F03D 1/06* (2006.01)
  *B64C 11/00* (2006.01)

(56) References Cited

U.S. PATENT DOCUMENTS

| | | | | |
|---|---|---|---|---|
| 8,035,242 | B2* | 10/2011 | Landa | F03D 7/0224 |
| | | | | 290/44 |
| 8,080,891 | B2 | 12/2011 | Schramm et al. | |
| 8,240,990 | B2 | 8/2012 | Kammer et al. | |
| 8,860,236 | B2* | 10/2014 | Nasiri | F03D 7/0272 |
| | | | | 290/44 |
| 9,407,187 | B2* | 8/2016 | Schroeder | H02P 15/00 |
| 9,413,217 | B2* | 8/2016 | Panosyan | H02K 49/046 |
| 9,534,583 | B2* | 1/2017 | Agarwal | F03D 7/0272 |
| 9,587,629 | B2* | 3/2017 | Deshpande | F03D 7/0224 |
| 9,601,918 | B2* | 3/2017 | Panosyan | H02P 9/04 |
| 9,745,958 | B2* | 8/2017 | Agarwal | F03D 7/044 |
| 2007/0116572 | A1* | 5/2007 | Barbu | F03D 7/0224 |
| | | | | 416/132 B |
| 2010/0068057 | A1* | 3/2010 | Friedrich | F03D 7/0244 |
| | | | | 416/1 |
| 2011/0089693 | A1* | 4/2011 | Nasiri | F03D 7/0272 |
| | | | | 290/44 |
| 2011/0140431 | A1* | 6/2011 | Landa | F03D 7/0224 |
| | | | | 290/44 |
| 2012/0104754 | A1* | 5/2012 | Rudolf | F03D 7/0284 |
| | | | | 290/44 |
| 2015/0069762 | A1 | 3/2015 | Mashtare et al. | |
| 2015/0118047 | A1* | 4/2015 | Yoon | F03D 11/0091 |
| | | | | 416/1 |
| 2015/0145251 | A1 | 5/2015 | Wagoner et al. | |
| 2015/0147173 | A1 | 5/2015 | Agarwal | |
| 2015/0361957 | A1* | 12/2015 | Agarwal | F03D 7/0272 |
| | | | | 290/44 |
| 2015/0377213 | A1* | 12/2015 | Deshpande | F03D 7/0224 |
| | | | | 290/44 |
| 2015/0377216 | A1* | 12/2015 | Deshpande | F03D 7/0224 |
| | | | | 416/1 |
| 2016/0118786 | A1* | 4/2016 | Zhu | F03D 7/0244 |
| | | | | 290/44 |
| 2017/0226987 | A1* | 8/2017 | Chacon | F03D 7/0244 |
| 2017/0268485 | A1* | 9/2017 | Shen | F03D 1/0675 |
| 2017/0306926 | A1* | 10/2017 | Deshpande | F03D 7/0296 |

OTHER PUBLICATIONS

Gros et al., "Optimization-based load reduction during rapid shutdown of multi-megawatt wind turbine generators", Wind Energy, vol. 17, Issue: 7, pp. 1055-1075, Jul. 2014.

Agarwal et al., "Methods and Systems to Operate a Wind Turbine", pending U.S. Appl. No. 14/306,362, filed Jun. 17, 2014. pp. 1-23.

Agarwal et al., "Methods and System for Managing Loads on a Wind Turbine", pending U.S. Appl. No. 14/303,052, filed Jun. 12, 2014. pp. 1-29.

* cited by examiner

Fig. 6

Send control signals to simultaneously use blades and generator to provide torque adjustment *601*

Fig. 7

Send control signals to generator to provide torque adjustment *701*

↓

If blades are needed and available for further torque adjustment, send controls signals to blades *702*

Fig. 8

If generator, converter, and grid are functional to provide at least some first level of torque adjustment, send control signals for using generator, converter, and grid to provide that torque adjustment *801*

↓

If generator, converter, and grid are not functional to provide all of the first level of torque adjustment, provide control signal or signals for using electrical brake to provide at least some other of the first level of torque adjustment *802*

WIND TURBINE DECELERATION METHOD AND SYSTEM

BACKGROUND

The subject matter disclosed herein relates generally to deceleration of wind turbines.

Wind turbines are increasingly gaining importance as renewable sources of energy generation and are increasingly being applied to large-scale power generation applications. Maximizing energy output while minimizing loads of the wind turbines in varied wind conditions is a challenge that exists in harnessing wind energy.

A wind turbine typically includes a tower and a rotor rotatably coupled to two or more blades. The blades are acted upon by a wind flow to rotate the rotor. The speed of the wind turbine is dependent upon multiple factors including angle of attack, speed of wind, and pitch angle of a blade, for example. The angle of attack is an angle between a reference line of an airfoil of the blade and a direction of the wind flow acting upon the blade. The pitch angle of a blade of a wind turbine refers to a position of the blade with respect to the direction of the wind through which the blade rotates. The pitch angle of the blade may be changed to change the angle of attack of the blade and thereby change the speed of the wind turbine.

Speed control and emergency braking capability are important for maintaining structural stability and longevity of components within wind turbines. For example, controlling the speed of a wind turbine rotor below its maximum limit is important in order to avoid the damaging effects of high velocity winds on the wind turbine blades, rotor, and tower.

Under normal wind and operating conditions, deceleration of a wind turbine may be achieved by pitching the wind turbine blades to be more closely aligned with the direction of the wind. Under certain transient or fault conditions, blade pitching may be inadvisable or may provide an insufficient level of deceleration.

One example of a technique other than blade pitching which has been used for braking wind turbines during emergencies or other events that require stopping turbines, is mechanical braking. However, true dynamic control is difficult to achieve in mechanical braking during operation of wind turbines. Additionally, the amount of torque provided will typically not be constant over time due to variables such as temperature and wear.

In another technique other than blade pitching for braking, an electrical brake is used instead of or in combination with a mechanical brake. For example, to enable dynamic braking control, commonly assigned Schramm U.S. Pat. No. 8,080,891 describes an embodiment wherein a mechanical brake and an electrical braking circuit are activated simultaneously in response to a braking event such that the electrical circuit enables early and controlled absorption of excess power during a response delay of the mechanical brake.

In wind turbine embodiments wherein multiple brakes are available, it would be desirable to have a flexible control method for both braking and deceleration. Additionally, for embodiments including a mechanical brake, it would be desirable to have a method with a reduced duty cycle of the mechanical brake to enable longer life of the mechanical brake.

BRIEF DESCRIPTION

Briefly, in accordance with one embodiment disclosed herein, a wind turbine comprises wind turbine blades, a wind turbine rotor coupled to the wind turbine blades, a wind turbine generator coupled to the wind turbine rotor, a wind turbine converter coupled to the wind turbine generator, a controllable brake comprising one or more sources of controllable rotor torque adjustment for providing a first level of torque adjustment, a discrete brake for more coarsely providing a second level of torque adjustment, and a controller programmed for responding to a deceleration event by determining a required torque adjustment for braking, determining a sequence of applying the controllable brake and the discrete brake for driving a combination of the first and second levels of torque adjustment towards the required torque adjustment, and providing control signals for decelerating the wind turbine.

In accordance with another embodiment disclosed herein, a method is provided for operating a wind turbine comprising blades, a rotor coupled to the blades, a generator coupled to the rotor, a converter coupled to the generator, a controllable brake comprising one or more sources of controllable rotor torque adjustment for providing a first level of torque adjustment, and a discrete brake for more coarsely providing a second level of torque adjustment. The method comprises responding to a deceleration event by: determining a required torque adjustment for braking, determining a sequence of applying the controllable brake and the discrete brake for driving a combination of the first and second levels of torque adjustment towards the required torque adjustment, and providing control signals for decelerating the wind turbine.

DRAWINGS

These and other features, aspects, and advantages of the present invention will become better understood when the following detailed description is read with reference to the accompanying drawings in which like characters represent like parts throughout the drawings, wherein:

FIGS. 6-8 are flow charts of embodiments of example methods for providing control signals to the controllable brake of FIGS. 1 and 2.

DETAILED DESCRIPTION

In wind turbine configurations including discrete brakes such as mechanical brakes, one challenge is enabling deceleration and braking in a timely manner while reducing duty cycle and associated wear on the discrete brake. In one embodiment disclosed herein, to address this challenge, discrete (on-off) application of the mechanical brake provides a coarse application of an uncertain amount of braking torque which, when needed, is augmented with a fine application of a controllable braking torque. The combination of the discrete and controllable braking may more precisely regulate wind turbine rotor shaft speed and loads. Although mechanical brakes are described for purposes of example, the discrete brake need not be mechanical, and in another embodiment may comprise an on-off type of electrical brake, for example.

Unless defined otherwise, technical and scientific terms used herein have the same meaning as is commonly understood by one of ordinary skill in the art to which this disclosure belongs. The terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "controller," and "processor" may include either a single component or a plurality of components, which are active and/or passive and are connected or otherwise coupled together to provide the described function. When controller and/or processing functions are embodied in a computer, the computer executes non-transitory code or instructions stored in or accessed from a machine-readable medium (such as a memory unit) to implement the techniques disclosed herein.

Figure 1:
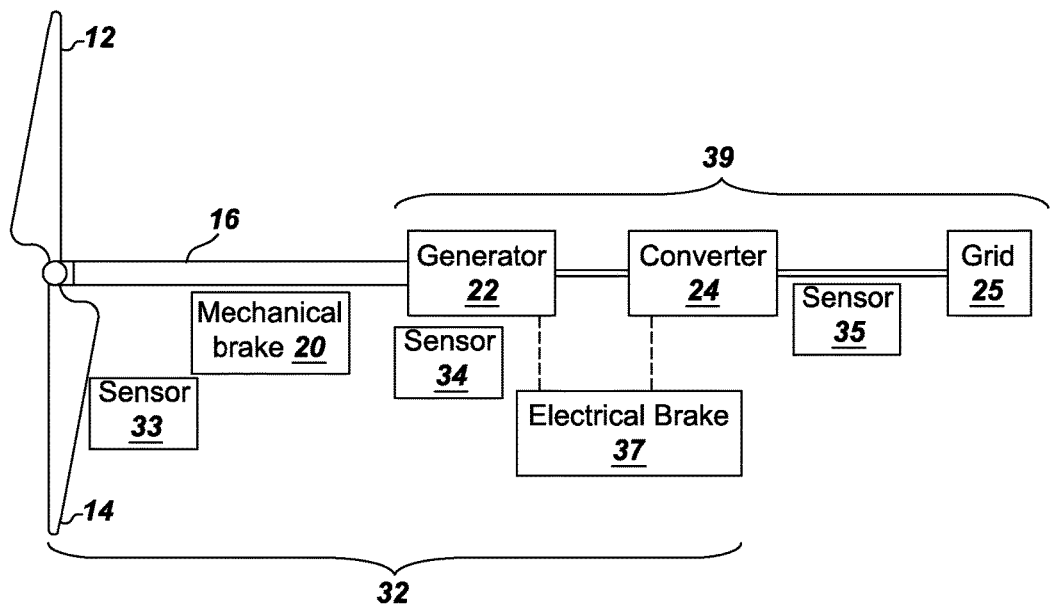
FIG. 1 is a block diagram of a wind turbine in accordance with an embodiment disclosed herein.
Figure 2:
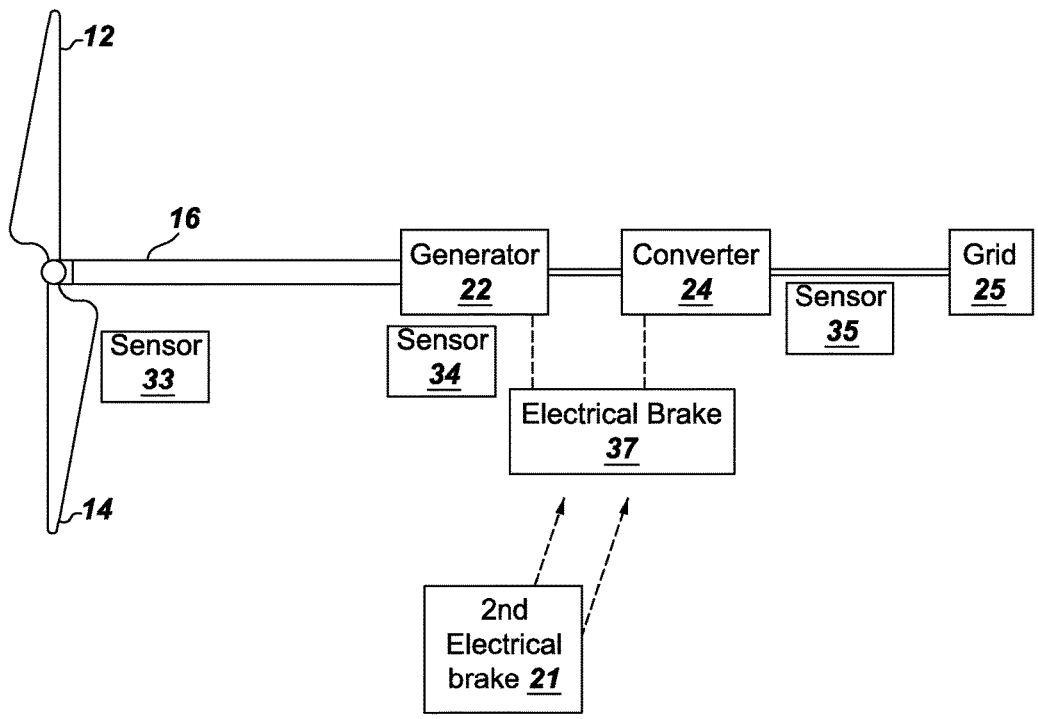
FIG. 2 is a block diagram of a wind turbine in accordance with another embodiment disclosed herein.

Turning to the figures, FIGS. 1 and 2 are block diagrams of a wind turbine according to two example embodiments disclosed herein. Although wind turbine 10 is illustrated as a horizontal-axis wind turbine, in some embodiments, wind turbine 10 may comprise a vertical-axis configuration and/or a wind mill type wind turbine (not shown).

Wind turbine 10 includes blades 12, 14 coupled to a rotor shaft 16. A generator 22 is further coupled to rotor shaft 16. A gearbox (not shown) may additionally be coupled to rotor shaft 16 between blades 12, 14 and generator 22. A converter 24 is electrically coupled to generator 22. A transformer (not shown) and/or power conditioning equipment may be coupled between converter 2.4 and a grid 30. One or more sensors 33, 34, 35 are coupled to wind turbine 10. A controllable brake 32 comprises one or more sources of torque adjustment or, more specifically, may comprise rotor blades 12, 14, generator 24, and optionally electrical brake 37. Electrical brake 37 may optionally be coupled to either generator 22 or converter 24. A discrete brake 20, 21 may comprise either a mechanical brake 20 (FIG. 1) coupled to rotor 16 or a second electrical brake 21 (FIG. 2) coupled to generator 22 (either directly or through converter 24), for example. A controller 36 (FIG. 3) is configured to receive commands and feedback signals and to generate commands (or control signals) for general control of wind turbine 10 as well as specific control of the deceleration described herein.

In an exemplary operation of wind turbine 10, wind exerts force on blades 12, 14 that in turn rotate rotor shaft 16. Although two blades 12, 14 are shown in the block diagrams of FIGS. 1-2 for ease of example, any desired number and type of blades may be utilized. Generator 22 is configured to generate an AC power that is converted to grid compatible AC power by converter 24. Generator 22 may comprise any suitable type of electrical generator, such as, but not limited to, a wound rotor induction generator. Wind turbine 10 may receive electrical power from grid 30 to drive operation of the wind turbine 10 and/or its associated components and/or may supply electrical power generated by wind turbine 10 to grid 30. Three sensors are shown in FIG. 1 for purposes of example. Blade pitch angle sensors 33 detect the blade pitch angles of blades 12, 14, a generator sensor 34 is configured to measure one or more mechanical parameters of the shaft such as rotational speed and/or torque, and a power sensor 35 is configured to measure the power from converter 24. One or more other potential sensors (not shown) may also be included for measuring displacements, yaw, moments, strain, stress, twist, damage, failure, and/or grid or power anomalies, for example.

In the embodiment of FIG. 1, discrete brake 20 comprises a mechanical brake coupled to rotor shaft 16 and configured to apply counter torque during braking. Mechanical brake 20 may comprise any suitable rotor shaft brake with several non-limiting examples including a drum brake or a disk brake. In one embodiment, mechanical brake 20 is driven by a hydraulic system (not shown).

When electrical brake 37 is coupled to generator 22, it may be coupled to an output side of generator 22 through one or more semiconductor switches (not shown) and include a resistor (not shown) for absorbing excess power from generator 22. Alternatively, electrical brake 37 may be coupled to converter 24 to absorb or capture energy therefrom and may either comprise a resistor or an energy storage element such as a battery (not shown). In either example, as power is absorbed, counter torque is provided such that the rotor shaft speed decreases.

In the embodiment of FIG. 2, instead the mechanical brake 20 of FIG. 1, the discrete brake comprises a second electrical brake 21. Second electrical brake 21 may similarly be coupled to generator 22 or converter 24 but is designed to still be a discrete, on-off type of brake such that braking happens coarsely via that electrical brake 21 and more finely by application of controllable brake 32. Other non-limiting examples of potential discrete brakes include hydraulic parking brakes, electromechanical brakes, centrifugal brakes, Eddie-current brakes (retarders), and magnetic brakes.

Figure 3:
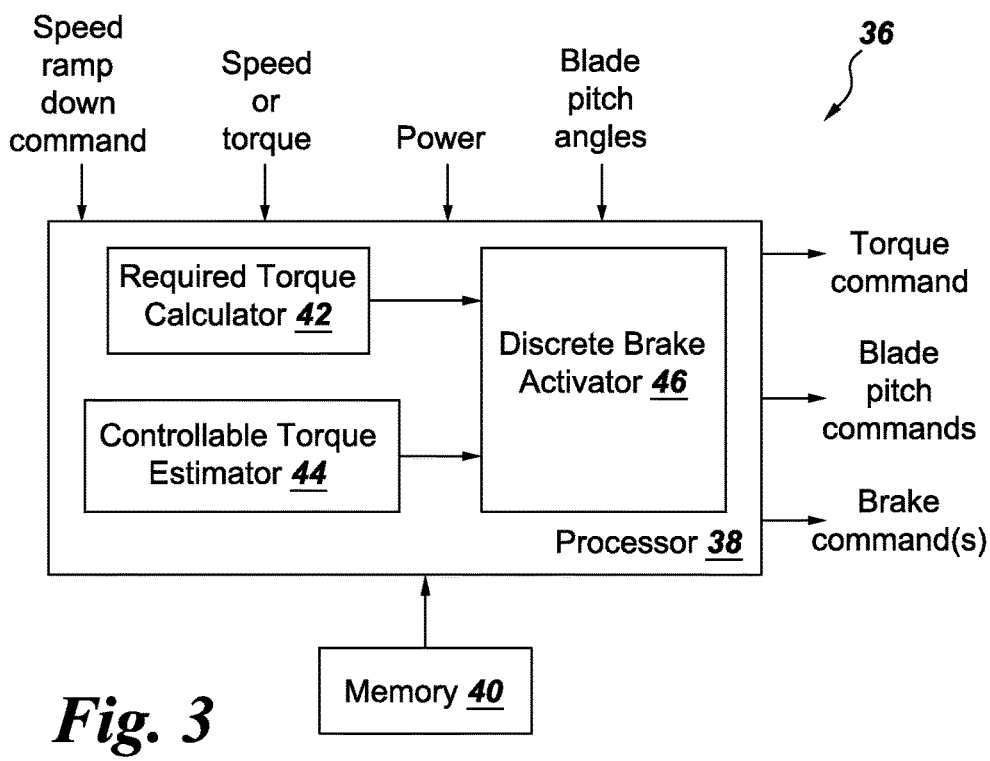
FIG. 3 is a block diagram of a controller for a wind turbine in accordance with the embodiments of FIGS. 1 and 2.

FIG. 3 is a block diagram of controller 36 comprising a processor 38 for executing non-transitory code or instructions stored in or accessed from a memory unit 40 to implement the techniques disclosed herein. In a more specific embodiment, processor 38 includes a required torque calculator 42, a controllable torque estimator 44, and a discrete brake activator 46, the features of which are described below with respect to FIGS. 4-8. Controller 36 may be disposed within wind turbine 10. However, additionally or alternatively, controller 36 may be remote from wind turbine 10 and/or other components of the wind turbine 10.

Figure 4:
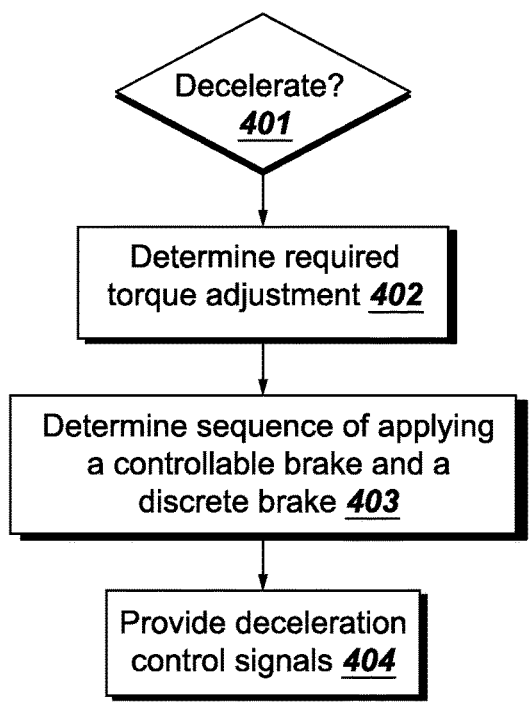
FIG. 4 is a flowchart of a method for decelerating a wind turbine in accordance with embodiments disclosed herein.

FIG. 4 is a flowchart of a method for decelerating wind turbine 10 in accordance with an embodiment disclosed herein. In one embodiment, these steps are carried out by controller 36. At step 401 either a deceleration command is received from a grid or plant operator or it is determined that a deceleration is needed in light of a sensor value being out of tolerance, for example.

Step 402 includes a determination of a required torque adjustment to address the deceleration event such as may be calculated by required torque calculator 42 of FIG. 3. Torque calculator 42 may comprise a proportional-integral-derivative controller, for example. One more specific example technique for determining the required torque adjustment is described in commonly assigned U.S. patent application Ser. No. 14/306362, filed 17 Jun. 2014, which is herein incorporated by reference in its entirety and provides the following torque control dynamics transfer functions:

$$N\delta T_{gen} = -\frac{\partial M_2 Aero}{\partial w_r}\partial w_r - K_{P w_r}\delta w_r + K_{I w_r}\int(\delta w_{r,ref} - \delta w_r) - K_{D,w_r}\delta w_r \quad (1)$$

-continued $$\frac{\partial M_2 Aero}{\partial \theta} \partial \theta = -\frac{\partial M_2 Aero}{\partial w_r} \partial w_r - K_{Pw_r} \delta w_r + \quad (2)$$
$$K_{Iw_r} \int (\delta w_{r,ref} - \delta w_r) - K_{D,w_r} \delta \dot{w}_r + N \delta T_{gen}$$

wherein $\partial M_z Aero$ is aerodynamic torque, $K_{Pw_r}$ is a proportional control gain, $\delta T_{gen}$ is required counter torque, $K_{D,w_r}$ is a derivative control gain, $K_{Iw_r}$ is an integral control gain, $\delta w_{r,ref}$ is the commanded rotor speed, $\partial w_r$ is current rotor speed, N is gear ratio of a gearbox, $\delta \dot{w}_r$ is current rotor acceleration, and $\partial \theta$ is a collective current pitch angle of the blades 24.

At step 403, a sequence of applying controllable brake 32 and discrete brake 20, 21 for driving a combination of braking torque adjustment towards the required torque adjustment is determined. Finally, at step 404, control signals are provided for decelerating wind turbine 10. These control signals may include one or more of activating discrete brake 20, 21, modifying a torque command of generator 22, modifying one or more blade pitch commands, and activating controllable electrical brake 37, for example. As discussed above, the combination of the discrete and controllable braking is expected to more precisely regulate wind turbine rotor shaft speeds and loads. Additionally, redundancy is provided in situations wherein the sequence is determined based at least in part on the operability of the discrete brake and the operability of the controllable brake.

Figure 5:
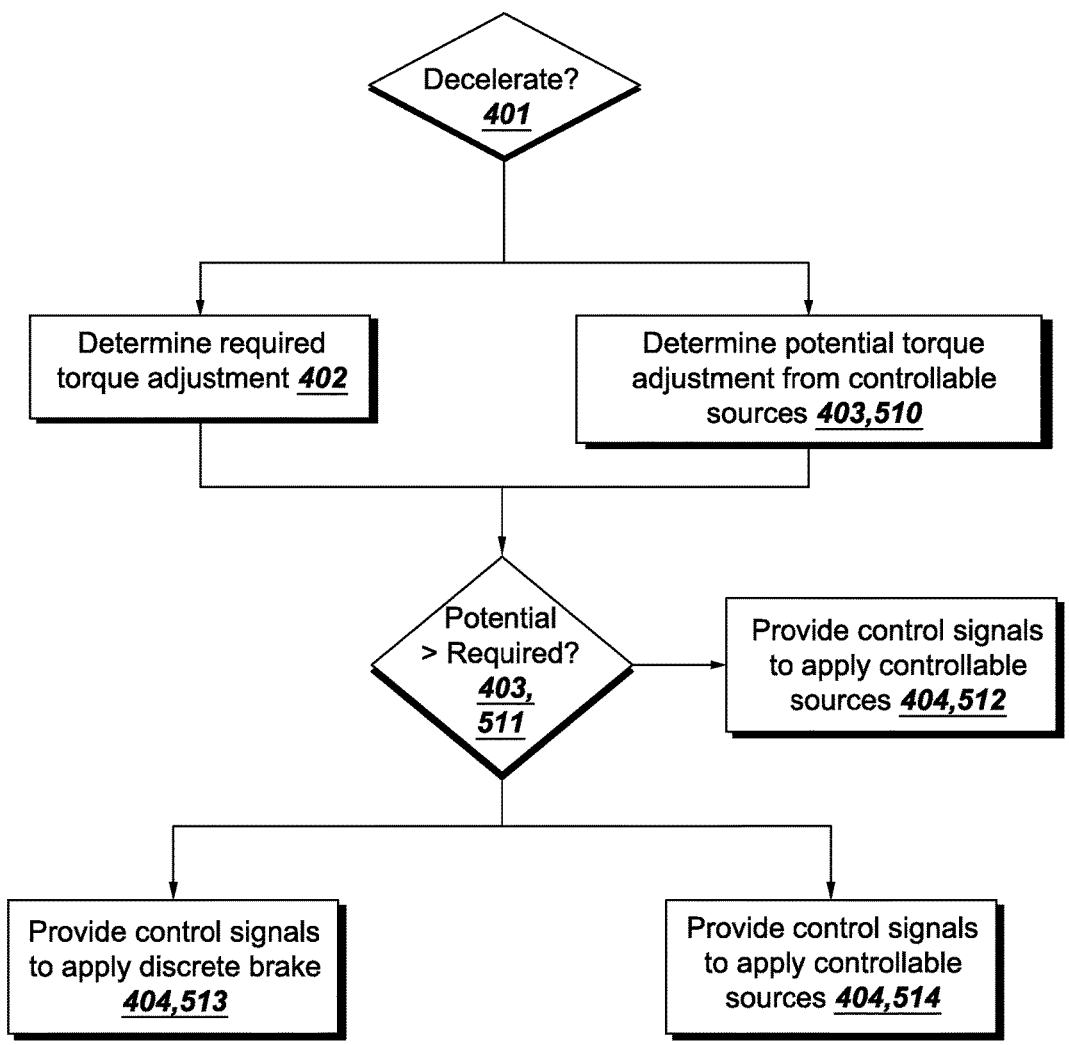
FIG. 5 is a flowchart of a more specific example of a method for decelerating a wind turbine in accordance with embodiments disclosed herein.

FIG. 5 is a flowchart of a more specific example of a method for decelerating wind turbine 10 in accordance with embodiments disclosed herein. Steps 401 and 402 are the same as discussed with respect to FIG. 4. In the embodiment of FIG. 5, the step 403 of determining the sequence of applying the controllable brake 32 and discrete brake 20, 21 is represented by steps 510 and 511.

At step 510, potential sources of controllable rotor torque are evaluated to determine what total amount of potential torque adjustment is available. As one example of a potential source of controllable rotor torque, a main electrical system 39 (FIG. 1) represented by generator 22, converter 24, and grid 30 may have counter torque which may be supplied to rotor shaft 16. More specifically, when all the components of main electrical system 39 are available and in operating condition, then the electrical system itself may typically provide at least some of the required torque adjustment. This source may be limited, however, at high wind speeds when the turbine is already operating at rated torque (such that the delta margin by which one could increase the counter torque and reduce rotor speed is low).

In embodiments which include electrical brake 37, electrical brake 37 is useful to provide counter torque when needed to supplement the torque available from main electrical system 39 or when one or more elements of main electrical system 39 is not available. This is particularly useful when grid 30 is experiencing fault conditions. One example of an electrical brake including a resistor (not shown), for example, is shown by aforementioned US Schramm U.S. Pat. No. 8,080,891, which is herein incorporated by reference in its entirety. One example of an electrical brake including an energy storage unit is commonly assigned Wagoner US20150145251, which is herein incorporated by reference in its entirety. The amount of rotor torque which may be provided will be dependent on the size/capacity of the resistor or energy storage element.

As another example of a potential source of controllable rotor torque, there may be counter torque available from pitching blades 12, 14. Such counter torque is most available when there is no blade pitch asymmetry or fault and wind conditions permit further pitching. However, in extreme load conditions, if one blade is faulty, the objective of reducing the rotor speed to reduce thrust that the faulty blade is experiencing should be balanced with concern about pitching the functional blades so far towards the feather position that increased rotor and tower imbalance loads will occur. In such situations, the blades may not be the best source of controllable rotor torque.

In one embodiment, for example, in the manner described in aforementioned U.S. patent application Ser. No. 14/306362, the difference between a commanded torque adjustment and the torque adjustment available from generator-based torque adjustment techniques may be calculated and then used in conjunction with the current pitch angle and one or more aerodynamics sensitivities to determine a pitch alteration that would be required in order for the combined controllable brake 32 to provide a commanded torque adjustment. The aerodynamic sensitivities may include rate of change of aerodynamic load with respect to rate of change of pitch angle. In one embodiment, the required pitch alteration may be determined using the following equation (3):

$$\delta \theta = \frac{\partial M_2 Aero}{\partial \theta} * (\text{required residual counter torque}) * N \quad (3)$$

wherein $\delta \theta$ is required pitch alteration, $$\frac{\partial M_2 Aero}{\partial \theta}$$

is an aerodynamic sensitivity, N is gear ratio of a gearbox (not shown). If it is not possible to pitch the blades as far as needed without significantly increasing rotor and tower imbalance loads, then, in this embodiment, it is clear that the potentially controllable torque adjustment is not sufficient to meet the required torque adjustment. This embodiment is provided for purposes of example only. Another approach, for example, would be to assess how far the blades could safely be pitched, calculate the counter torque that such pitching would generate, and add that to the available generator-based counter torque.

At step 511, it is determined whether the potential controllable torque adjustment is sufficient to meet the required torque adjustment. This information is used as part of the decision making process for an example embodiment of the control signal generating step 404 of FIG. 4. If the answer is yes, at step 512, then discrete brake 20, 21 is not used and instead the one or more sources of controllable rotor torque adjustment of controllable brake 22 are used for providing a first level of torque adjustment that meets the required torque adjustment (in which case a second level of torque adjustment from discrete brake 20, 21 may be zero). If the answer is no, then discrete brake 20, 21 is applied for coarsely providing the second level of torque adjustment at step 513, and the one or more sources of controllable rotor torque adjustment are used, to the extent available, for providing the first level of torque adjustment in a manner that the combination of the first and second levels of torque adjustment is driven towards the required torque adjustment at step 514.

FIGS. 6-8 are flow charts of embodiments of example methods for providing control signals to the controllable brake of FIG. 1. These embodiments are for example purposes only as there may be other methods for determining which controllable source to draw from first when multiple sources may be available.

In the embodiment of FIG. 6, if torque adjustment is available from both generator 22 and blades 12, 14, then control signals are sent to simultaneously use these sources to provide the torque adjustment at step 601. In this embodiment, there typically would be a feedback loop (not shown) within the controller 36 for ascertaining when the required torque adjustment has been provided.

In the embodiment of FIG. 7, the preference is to first use generator 22 based techniques (including, if available and needed, electrical brake 37) for providing torque adjustment at step 701. If use of generator 22 is not sufficient, then the blade pitching is used to the extent available and needed for torque adjustment at step 702. These steps are shown as sequential for purposes of illustration but need not be sequential. For example, when determining the potential torque adjustment from controllable sources at step 510 in FIG. 5, if it is already known that generator 22 will be unable to provide sufficient torque adjustment, the control signals may be sent simultaneously as shown in FIG. 6.

In the embodiment of FIG. 8, at step 801, when generator 22 and converter 24 are coupled to grid 30 and each are functional to provide at least some of the first level of torque adjustment, the controller is programmed to send control signals for using those elements to provide the at least some of the first level of torque adjustment (the controllable torque adjustment). Further, at step 802, in embodiments including electrical brake 37, when the combination of generator 22, converter 24, and grid 30 is not functional to provide all of the first level of torque adjustment, the controller is programmed for sending one or more control signals for using electrical brake 37 to provide the at least some other of the first level of torque adjustment.

When fully braking the wind turbine to a shutdown condition, the discrete brake may be left on indefinitely. In contrast, when reducing the rotor speed but continuing to operate, a short application of the discrete brake in conjunction with other existing braking mechanisms may be use for mitigating rotor over speeds and thereby keeping the loads in check.

Use of both a discrete brake and a controllable brake has some advantages in flexibility of design. For example, if a wind turbine has energy storage of sizable amount for reasons in addition to controllable braking, then a smaller mechanical type brake could be used. Furthermore, the maximum torque provided by a mechanical brake can vary with oil and temperature conditions. Having another source of counter torque is useful to provide the fine control and enable the desired deceleration or braking.

While only certain features of the invention have been illustrated and described herein, many modifications and changes will occur to those skilled in the art. It is, therefore, to be understood that the appended claims are intended to cover all such modifications and changes as fall within the true spirit of the invention. Aspects from the various embodiments described, as well as other known equivalents for each such aspect, can be mixed and matched by one of ordinary skill in the art to construct additional embodiments and techniques in accordance with principles of this application. Further, the limitations of the following claims are not written in means-plus-function format and are not intended to be interpreted as being means-plus-function claims, unless and until such claim limitations expressly use the phrase "means for" followed by a statement of function void of further structure.

The invention claimed is:

1. A wind turbine comprising:
   wind turbine blades;
   a wind turbine rotor coupled to the wind turbine blades;
   a wind turbine generator coupled to the wind turbine rotor;
   a wind turbine converter coupled to the wind turbine generator;
   a controllable brake comprising one or more sources of controllable rotor torque adjustment for providing a first level of torque adjustment, wherein the one or more sources of controllable rotor torque adjustment comprise the wind turbine blades and the wind turbine generator;
   a discrete brake for more coarsely providing a second level of torque adjustment; and
   a controller programmed for responding to a deceleration event by determining a required torque adjustment for braking, determining a sequence of applying the controllable brake and the discrete brake for driving a combination of the first and second levels of torque adjustment towards the required torque adjustment, and providing control signals for decelerating the wind turbine.

2. The wind turbine of claim 1 wherein the controller is programmed for determining whether a potential first level of torque adjustment from the controllable brake meets the required torque adjustment, and
   if so, providing control signals for using the controllable brake for providing the required torque adjustment; or
   if not, providing control signals for applying the discrete brake for more coarsely providing the second level of torque adjustment and for using the controllable brake for more finely providing the first level of torque adjustment.

3. The wind turbine of claim 2 wherein the discrete brake comprises a mechanical brake.

4. The wind turbine of claim 2 wherein the discrete brake comprises an electrical brake.

5. The wind turbine of claim 1 wherein the one or more sources of controllable rotor torque adjustment further comprises a controllable electrical brake.

6. The wind turbine of claim 5 wherein the discrete brake comprises a mechanical brake or a second electrical brake, which is designed to be a discrete, on-off type of brake.

7. The wind turbine of claim 5 wherein the controller is further programmed for sending control signals to simultaneously use the wind turbine blades and the wind turbine generator to provide the first level of torque adjustment.

8. The wind turbine of claim 5 wherein the controller is further programmed for sending control signals to use the wind turbine generator to provide at least some of the first level of torque adjustment and, if necessary, also sending control signals to use the wind turbine blades to provide the first level of torque adjustment.

9. The wind turbine of claim 5 wherein when the wind turbine generator and the wind turbine converter are coupled to a grid and each of the wind turbine generator, the wind turbine converter, and the grid are functional to provide at least some of the first level of torque adjustment, the controller is programmed to send control signals for using the wind turbine generator, the wind turbine converter, and the grid to provide the at least some of the first level of torque adjustment, and wherein when the wind turbine generator, the wind turbine converter, and the grid are not functional to provide all of the first level of torque adjustment, the controller is programmed for sending one or more control signals for using the controllable electrical brake to provide the at least some other of the first level of torque adjustment.

10. The wind turbine of claim 1 wherein the controller is programmed for determining the sequence of applying the discrete brake and the controllable brake based at least in part on the operability of the discrete brake and the operability of the controllable brake.

11. A method of decelerating a wind turbine comprising wind turbine blades, a rotor coupled to the wind turbine blades, a wind turbine generator coupled to the rotor, a converter coupled to the wind turbine generator, a controllable brake comprising one or more sources of controllable rotor torque adjustment for providing a first level of torque adjustment, wherein the one or more sources of controllable rotor torque adjustment comprise the wind turbine blades and the wind turbine generator, and a discrete brake for more coarsely providing a second level of torque adjustment, the method comprising:

responding to a deceleration event by:
determining a required torque adjustment for braking,
determining a sequence of applying the controllable brake and the discrete brake for driving a combination of the first and second levels of torque adjustment towards the required torque adjustment; and
providing control signals to the controllable brake, the discrete brake, or both for decelerating the wind turbine.

12. The method of claim 11 wherein determining the sequence of applying the controllable brake and the discrete brake and providing control signals comprise:
determining whether a potential first level of torque adjustment from the controllable brake meets the required torque adjustment, and
if so, providing control signals for using the controllable brake for providing the required torque adjustment; or
if not, providing control signals for applying the discrete brake for more coarsely providing the second level of torque adjustment and for using the controllable brake for more finely providing the first level of torque adjustment.

13. The method of claim 11 wherein the one or more sources of controllable rotor torque adjustment further comprises a controllable electrical brake.

14. The method of claim 13 wherein the discrete brake comprises a mechanical brake or a second electrical brake, which is designed to be a discrete, on-off type of brake.

15. The method of claim 11 wherein the sequence of applying the discrete brake and the controllable brake is determined based at least in part on the operability of the discrete brake and the operability of the controllable brake.

* * * * *